(12) United States Patent
Wilson

(10) Patent No.: US 7,091,163 B2
(45) Date of Patent: Aug. 15, 2006

(54) FLUSHING SOLUTIONS FOR COATINGS REMOVAL

(75) Inventor: Neil R. Wilson, Lake Orion, MI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 179 days.

(21) Appl. No.: 10/183,662

(22) Filed: Jun. 25, 2002

(65) Prior Publication Data

US 2004/0002437 A1    Jan. 1, 2004

(51) Int. Cl.
  *C11D 9/22* (2006.01)
  *C11D 9/30* (2006.01)
  *C11D 1/72* (2006.01)

(52) U.S. Cl. ............. 510/174; 510/176; 510/200; 510/201; 510/212; 510/437

(58) Field of Classification Search ............... 510/174, 510/176, 200, 201, 212, 437
See application file for complete search history.

(56) References Cited

U.S. PATENT DOCUMENTS

| | | | |
|---|---|---|---|
| 2,951,043 A | 8/1960 | Blank ................... 252/171 |
| 2,971,919 A | 2/1961 | Goldsmith ............. 252/139 |
| 3,179,597 A | 4/1965 | Mankowich |
| 3,553,144 A | 1/1971 | Murphy ................. 252/158 |
| 3,615,827 A | 10/1971 | Murphy ................. 134/38 |
| 3,681,250 A | 8/1972 | Murphy ................. 252/158 |
| 3,847,839 A | 11/1974 | Murphy et al. ......... 252/544 |
| 4,090,001 A | 5/1978 | Mertzweiller nee Maillard et al. .................. 427/444 |
| 4,294,617 A | 10/1981 | Schlicklin et al. ..... 106/14.37 |
| 4,619,706 A | 10/1986 | Squires et al. ......... 134/2 |
| 4,673,524 A * | 6/1987 | Dean .................... 510/413 |
| 4,675,125 A * | 6/1987 | Sturwold ............... 510/264 |
| 4,770,713 A | 9/1988 | Ward .................... 134/38 |
| 4,808,329 A | 2/1989 | Marlis et al. |
| 5,006,279 A | 4/1991 | Grobbel et al. ........ 252/542 |
| 5,391,234 A | 2/1995 | Murphy ................. 134/38 |
| 5,411,678 A | 5/1995 | Sim ..................... 252/548 |
| 5,454,985 A | 10/1995 | Harbin ................. 252/558 |
| 5,468,422 A * | 11/1995 | Khouzam et al. ....... 134/1 |
| 5,536,439 A | 7/1996 | Harbin ................. 510/212 |
| 5,604,192 A | 2/1997 | Michael et al. |
| 5,632,822 A | 5/1997 | Knipe, Jr. et al. ..... 134/22.12 |
| 5,701,922 A | 12/1997 | Knipe, Jr. et al. ..... 134/100 |
| 5,721,204 A | 2/1998 | Maxwell et al. ....... 510/206 |
| 5,759,975 A | 6/1998 | Maxwell ............... 510/203 |
| 5,854,190 A | 12/1998 | Knipe, Jr. et al. ..... 510/241 |
| 5,954,891 A | 9/1999 | Kondoh et al. ......... 134/40 |
| 5,972,865 A | 10/1999 | Knipe, Jr. et al. ..... 510/212 |
| 5,990,062 A | 11/1999 | Summerfield et al. ... 510/204 |
| 6,200,940 B1 | 3/2001 | Vitomir ................ 510/206 |
| 6,303,552 B1 | 10/2001 | Vitomir ................ 510/202 |
| 2002/0144718 A1 | 10/2002 | Wilson |

FOREIGN PATENT DOCUMENTS

| | | | |
|---|---|---|---|
| EP | 1375606 | * | 1/2004 |
| WO | WO99/06506 | | 2/1999 |
| WO | WO 99/06506 | | 2/1999 |

* cited by examiner

*Primary Examiner*—Brian P. Mruk
(74) *Attorney, Agent, or Firm*—Stephen D. Harper; Mary K. Cameron

(57) ABSTRACT

A flushing solution containing: a) a solvent component, b) an alkaline source; and c) a corrosion inhibitor component is provided. The solvent component preferably contains an alkoxylated aromatic alcohol. The corrosion inhibitor component may contain a fatty acid salt, a mixture of an aliphatic phosphate ester and a buffering agent such as boric acid or phosphoric acid, a mixture of a fatty acid salt, aliphatic phosphate ester, and buffering agent, or a mixture of a fatty acid salt and buffering agent. Alkanolamines are preferably used to form the fatty acid salt and/or as the alkaline source. The flushing solutions can be prepared in stable concentrated form and are useful for removing coatings such as paint from substrate surfaces.

44 Claims, No Drawings

FLUSHING SOLUTIONS FOR COATINGS REMOVAL

FIELD OF THE INVENTION

This invention relates to flushing solutions used to remove paint and other coatings from surfaces and coating application equipment.

BACKGROUND OF THE INVENTION

Current commercial practice utilizes aqueous flushing solutions that contain amines and an organic solvent selected from lower alcohols and glycol ethers. The flushing solutions can be used to remove paint and other coatings from surfaces and coating application equipment. Generally, alkanolamines like dimethylethanolamine, isopropanolamine and diethanolamine are used. Flushing solutions can be prepared from flushing concentrates, which are marketed to the end user. The flushing concentrates are usually diluted to 5% to 15% by volume with deionized water.

U.S. Pat. No. 5,632,822 discloses a water in oil emulsion paint remover used to strip cured paint from surfaces. This emulsion is prepared by adding a non-polar mixture containing benzyl alcohol to a polar mixture containing water, an alkanolamine and polyethoxylated sorbitan monooleate. U.S. Pat. No. 6,303,552 discloses a paint stripper composition containing 20% to 50% benzyl alcohol and 0.5% to 5% by weight of an accelerator. The accelerators include alkanolamines including ethanolamine, triethanolamine, or any combination thereof. This paint stripper can also contain an emulsifier such as polyethoxylated sorbitan monolaurate, polyethoxylated sorbitan monopalmitate, polyethoxylated monostearate, polyethoxylated tristearate, polyethoxylated monoleate, trioleate polysorbates, and mixtures thereof. Chelating agents such as phosphoric acid, citric acid salts and EDTA can also be included in the stripper composition.

The pH of flushing solutions usually ranges from 8.5 to 11. The alkaline pH causes surface corrosion of the coating application equipment, e.g., the aluminum or aluminum alloy spray equipment used in the auto paint industry. The spray equipment typically uses aluminum or aluminum alloy rotating bell cups to atomize the paint. The aluminum bell cups have serrated edges around the outer perimeter. As the paint flows past the serrated edges, the paint is atomized. Corrosion of the rotating bell cups over time, particularly the serrated edges, affects the atomization of paint particles. As the atomization properties of the equipment changes, the quality of the paint finish also changes. As a result, corrosion of the spray equipment leads to a problem of quality control.

The addition of silicates and other corrosion inhibitors to the flushing solutions can be used to reduce the corrosion of aluminum and aluminum alloys. However, in the case of silicates, sufficient water must be present in the concentrate to maintain the silicates in solution. For example, it is very difficult to prepare stable silicate-containing flushing concentrates with less than 50% by weight water because the silicates will precipitate from the concentrate over time. The resulting flushing concentrate no longer possesses the chemical inhibition properties it was designed for. As a result, there is a need to develop flushing solutions with corrosion inhibitor systems that are stable when the flushing solution is in concentrate form.

SUMMARY OF THE INVENTION

The invention is directed to a flushing solution comprising: a) a solvent component, b) an alkaline source; and c) a compound derived from an organic or inorganic acid. The organic acids that can be used to form the flushing solutions include fatty acids. A flushing solution of the invention can be prepared using a mixture of a long chain fatty acid and an amine such as an alkanolamine. It is believed that at least a portion of the fatty acid reacts with the amine to form a fatty acid salt. Alternatively, a derivative of an inorganic acid may be used, such as, for example, an aliphatic phosphate ester containing at least two —OCH$_2$CH$_2$— units per molecule, in combination with a buffering agent.

In one embodiment, the flushing solution composition comprises: an organic solvent (preferably, a water-soluble or water-miscible organic solvent) selected from the group consisting of alcohols, glycols, glycol ethers, alkoxylated alcohol solvents, esters, ketones, and mixtures thereof; a fatty acid salt; and an alkaline source. A nitrogen-containing compound such as an amine or alkanolamine is preferably present, in either cationic form (as the counterion in the fatty acid salt, for example), as the free base (as part of the alkaline source, for example), or in both cationic and free base form. The alkaline source is selected from an inorganic base, e.g., sodium hydroxide or ammonia, and/or an organic base, e.g., an alkanolamine, an amine, or a mixture thereof, and is present in an amount effective to render the flushing solution basic.

The alkoxylated alcohol solvents preferably are selected from alkoxylated aromatic alcohols containing one or more compounds each containing at least one aromatic ring per molecule and alkoxylate units of general formula I

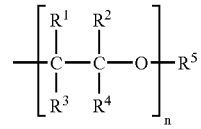

wherein: $R^1$, $R^2$, $R^3$ and $R^4$ are independently selected from hydrogen and methyl; $R^5$ is hydrogen, a $C_1$–$C_6$ alkyl, or phenyl; and n is 2–10. The alkoxylate unit(s) of formula I is (are) attached to the aromatic ring directly or through an ether (oxygen) linkage or an oxymethylene (—CHR$^8$O—) linkage, wherein $R^8$ is hydrogen or $C_1$–$C_4$ alkyl.

Another embodiment of the invention is directed to a flushing solution with a solvent component containing at least one alkoxylated aromatic alcohol described by formula I, an alkaline source, an aliphatic phosphate ester, and a buffering agent. The phosphate ester is preferably an ethoxylate phosphate ester containing at least two—OCH$_2$CH$_2$— units per molecule. The alkaline source is selected from an inorganic base, e.g., sodium hydroxide or ammonia, and/or an organic base, e.g., an alkanolamine, an amine, or a mixture thereof. The buffering agent is selected from buffering organic acids, buffering inorganic acids, salts of such acids, and mixtures thereof.

In another embodiment, the invention is directed to a flushing solution comprising an organic solvent (preferably, a water-soluble or water-miscible organic solvent) selected from the group consisting of alcohols, glycols, glycol ethers, alkoxylated alcohols, ketones, esters, and mixtures thereof; an alkaline source, a buffering agent, and a phosphate ester containing at least two —OCH$_2$CH$_2$— units per molecule. The alkaline source is selected from inorganic bases, e.g., sodium hydroxide or ammonia, and/or organic bases, e.g., an alkanolamine, an amine, or a mixture thereof. Preferably, the alkaline source comprises an alkanolamine. The buffering agent is selected from buffering organic acids, buffering inorganic acids, and mixtures thereof. The alkoxylated alcohol solvents preferable contain one or more compounds each of which contains at least one aromatic ring per molecule and one or more alkoxylate (oxyalkylene) units of general formula I.

The invention is also directed to methods of making the flushing solutions as well as using the flushing solutions to remove residual coating material from surfaces. In particular, the flushing solutions are used to remove residual coating material from coating application equipment.

The invention further provides a method of reducing the tendency of a flushing solution comprised of water, an organic solvent component and an alkaline source to cause corrosion when contacted with a substrate surface comprised of aluminum or an aluminum alloy. The method comprises incorporating an amount of a corrosion inhibitor component into the flushing solution that is effective to lower surface corrosion as compared to that obtained by the use of an analogous flushing solution that does not contain such corrosion inhibitor component. The pH of the flushing solution is maintained at a value of at least 8. The corrosion inhibitor component is comprised of at least one of: a) a fatty acid, b) a fatty acid salt, or c) both an aliphatic phosphate ester and a buffering agent.

DESCRIPTION OF THE INVENTION

The invention is directed to a flushing solution comprising: a) a solvent component b) an alkaline source (in an amount effective to render the flushing solution basic); and c) a corrosion inhibitor component selected from i) fatty acid salts, ii) mixtures of aliphatic phosphate esters and buffering agents, or combinations of i and ii. When used to remove a coating from a substrate surface, the flushing solution will typically also contain water. The fatty acids that can be used to form the fatty acid salt component of the flushing solutions include fatty acids with ten or more carbon atoms, with longer chain fatty acids (C$_{17}$ and higher) generally being preferred. The aliphatic phosphate esters preferably contain at least two —OCH$_2$CH$_2$— (oxyethylene) units per molecule. The preferred flushing solutions of the invention will comprise: a) a solvent component containing one or more compounds each of which contains at least one aromatic ring per molecule and alkoxylate units of general formula I

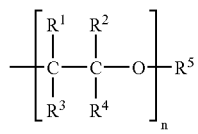

wherein: R$^1$, R$^2$, R$^3$ and R$^4$ are independently selected from hydrogen and methyl; R$^5$ is hydrogen, a C$_1$–C$_6$ alkyl, or phenyl; and n is 2, 3, 4, 5 or 6; b) an alkaline source; and c) the above-described corrosion inhibitor component. The alkoxylate units of formula I may preferably be attached to the aromatic ring directly or through an ether (oxygen) linkage or an oxymethylene (—CHR$^8$O—) linkage, wherein R$^8$ is hydrogen or C$_1$–C$_4$ alkyl.

The alkaline source is selected from an inorganic base, e.g., sodium hydroxide or ammonia, and/or an organic base, e.g., an alkanolamine, an amine, and/or a mixture thereof. Preferably, the alkaline source comprises an alkanolamine.

In one embodiment, the flushing solution contains a fatty acid salt having a cation component which preferably is an ammonium cation, more preferably an alkylammonium cation, most preferably an alkanolammonium cation. Alkali metal cations such as sodium and/or potassium cations may also be employed, although preferably at least a portion of the cations associated with the fatty acid component are nitrogen-containing cations (more preferably, at least a portion of such cations are alkanolammonium cations). The fatty acid salt may be formed by combining a fatty acid with amine, alkanolamine, or inorganic base (e.g., alkali metal hydroxide or ammonia). This flushing solution also contains one or more organic solvents selected from the group consisting of alcohols, glycols, glycol ethers, alkoxylated alcohols, esters, ketones, and mixtures thereof (preferably, solvents which are freely soluble in or miscible with, water), and an alkaline source. The alkaline source can be the same amine, alkanolamine or inorganic base used to form the fatty acid salt. It is preferred that the alkaline source be added in stoichiometric excess relative to the fatty acid. This provides a flushing solution with a pH of at least 8. It is believed that the fatty acid largely exists in salt (neutralized) form in the flushing solution, although minor quantities of free fatty acid may also be present.

In some cases (for example, where the corrosion inhibitor component contains an aliphatic phosphate ester but not a fatty acid salt), it is advantageous to additionally include a buffering agent in the flushing solution. The buffering agent can be any chemical buffering agent or system that provides and helps maintain a pH of the flushing solution that is lower than the pH of an essentially identical flushing solution that does not contain the buffering agent. The buffering agent can be a buffering organic acid or a salt thereof, a buffering inorganic acid or a salt thereof, or a mixture thereof. Certain alkaline sources may, in addition to functioning as a base to render the flushing solution basic, act as buffering agents (for example, salts of boric acid and phosphoric acid). If the buffering agent utilized is an inorganic acid or salt thereof, the use of a diprotic or triprotic acid or salt thereof is preferred. Preferred inorganic acids that can be used include phosphoric acid and boric acid. The list of buffering organic acids that can be used include, but are not limited to, acids containing two or more carboxylic acid groups per molecule such as gluconic acid, malic acid, glycolic acid, and citric acid.

The buffering agent can also reduce the amount of fatty acid salt needed to maintain optimal corrosion inhibition. A reduction in the amount of the fatty acid or fatty acid salt used to prepare the flushing solutions can minimize the amount of foaming in the paint wastewater tank. Foaming is preferably to be avoided.

Aromatic carboxylic acids such as benzoic acid have been found to be particularly useful as buffering agents which also help to suppress the foaming which would otherwise result in the absence of the aromatic carboxylic acid. In one embodiment of the invention, the flushing solution when in use to remove coatings from substrate surfaces contains from about 0.01 to about 1 weight percent aromatic carboxylic acid, more preferably from about 0.1 to about 0.5 weight percent aromatic carboxylic acid.

The flushing solutions, not including the amount of water present in the flushing solutions, contain from about 50% to about 99% by weight, preferably from about 65% to about 95% by weight, of the organic solvent component, from about 0.1% to about 25% by weight, preferably from about 0.5% to about 15% by weight, of the alkaline source (including the amount of the alkaline source which reacts with the fatty acid to form fatty acid salt), from about 0.05% to about 10% by weight, preferably from about 0.5% to about 5% by weight, of the fatty acid and/or the aliphatic phosphate ester. The flushing solutions can also include additives, e.g., one or more chelators, surfactants, and/or conventional corrosion inhibitors.

The flushing solutions can also include water. In fact, the flushing solutions that are produced and marketed to an end-user are usually in the form of a concentrated flushing solution, which may or may not itself contain water. The end-user then dilutes the flushing solution concentrate with water, preferably deionized water, to form an effective flushing solution concentration for a given task.

The addition of water to the flushing solution concentrates of the invention can facilitate the formulation of the concentrates at the production facility. As a result, although the flushing solution concentrates of the invention can be prepared and marketed without or with minimal amounts of water, it is preferred (but not necessary) to include water in the flushing solution concentrates during production. The amount of water in the flushing solution concentrates can range from 0% to 99% by volume. However, because of the economic cost of shipping and storing the concentrates, it is preferred that the flushing solution concentrates contain no more than 60% by volume water, preferably no more than 50% by volume water.

Alkoxylated alcohols are preferred for use as at least a portion of the organic solvent component of the flushing solution. Such alkoxylated alcohols preferably contain an aromatic ring, e.g., a phenyl ring, substituted on at least one position with an aliphatic group containing two or more alkoxylate units (preferably, ethoxylate units). The end alkoxylate unit is preferably end-capped (terminated) with a hydrogen atom. The aromatic ring can also contain one or more alkyl substituents of one to four carbons each. Examples of such alkyl substituents include methyl, ethyl, propyl, and isopropyl.

These alkoxylated aromatic alcohols are particularly useful in embodiments of the present invention where a flushing solution having a low VOC (Volatile Organic Compound) content is desired, as such alcohols are considerably less volatile than the aliphatic alcohols, glycol ethers, and other solvents typically used in such products but provide flushing solutions that are very effective in removing paint from substrate surfaces. Depending upon the VOC requirements of a particular application, any of these conventionally used organic solvents may be blended together with the alkoxylated aromatic alcohol in order to provide flushing solutions having a desired level of paint removal performance. Alternatively, such volatile alcohols, glycol ethers and other compounds may be used in the absence of any alkoxylated aromatic alcohol.

In one embodiment, the flushing solution comprises a solvent component containing one or more compounds each containing at least one aromatic ring and alkoxylate units of general formula I

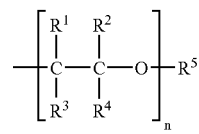

wherein: $R^1$, $R^2$, $R^3$ and $R^4$ are independently selected from hydrogen and methyl; $R^5$ is hydrogen, a $C_1$–$C_6$ alkyl, or phenyl; and n is 2–10. The alkoxylate unit of formula I may be attached to the aromatic ring directly or through an ether (oxygen) linkage or an oxymethylene (—$CHR^8O$—) linkage, wherein $R^8$ is hydrogen or $C_1$–$C_4$ alkyl.

Another embodiment contains a solvent component containing one or more alkoxylated compounds of general formula II with a number average (Navg.) of alkoxylate units per molecule from about 2.5 to about 5, wherein $R^1$, $R^2$, $R^3$, $R^4$ and $R^5$ are as defined in formula I, and $R^6$, $R^7$ and $R^8$ are independently selected from hydrogen and $C_1$–$C_4$ alkyl (preferably, no more than one of $R^6$–$R^8$ is a substituent other than hydrogen). $R^5$ preferably is hydrogen. Also, it is preferred that the substituents $R^1$, $R^2$, $R^3$ and $R^4$ combine to be at least 60 atom %, more preferably at least 80 atom %, hydrogen.

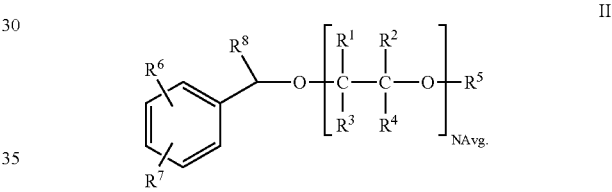

Another embodiment contains a solvent composition containing one or more ethoxylated compounds of general formula III with a number average (Navg.) of ethoxylate units from about 2.5 to about 5, wherein $R^1$, $R^2$, $R^3$, $R^4$ and $R^5$ are as defined in formula I, and $R^6$ and $R^7$ are independently selected from hydrogen and $C_1$–$C_4$ alkyl. Also, it is preferred that the substituents $R^1$, $R^2$, $R^3$ and $R^4$ combine to be at least 60%, more preferably at least 80%, hydrogen atoms. Further, it is preferred that $R^6$ and $R^7$ are both hydrogen atoms. In addition, in preferred embodiments of the invention $R^5$ is hydrogen.

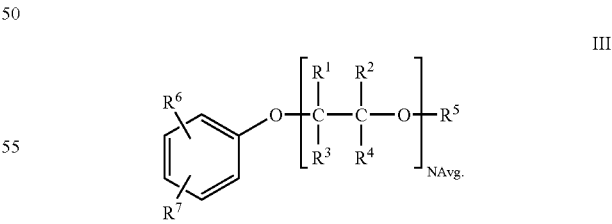

One type of solvent components that can be used is selected from the Genapol® family of solvents obtained from Clariant. For example, Genapol® BA 04 is a mixture of ethoxylated benzyl alcohols that contain from one to about 10 ethoxylate units. A small weight percentage of the solvent composition can comprise compounds with more than 10 ethoxylate units. The number average (Navg.) of ethoxylate units is about four.

Another type of solvent component that can be used is selected from the Harcross® family of solvents sold by Harcross Chemicals, Inc. For example, Harcross® T Det P4 is a mixture of ethoxylated phenols that contain from one to about 10 ethoxylate units. A small weight percentage of the solvent composition can also contain compounds with more than 10 ethoxylate units. The number average (Navg.) of ethoxylate units is about 3.3. The manufacturer reports that Harcross® T Det P4 includes the following distribution of degrees of ethoxylation where the number of ethoxylate units is indicated by n: 3.3% of n=1; 11.6% of n=2; 19.9% of n=3; 22.4% of n=4; 18.6% of n=5; 12.3% of n=6; 6.7% of n=7; 3.1% of n=8; and 1.26% of n=9.

Another type of solvent composition that can be used is represented by the ST-8329 solvent sold by Clariant Corporation. Clariant's ST-8329 solvent is a mixture of ethoxylated benzyl alcohols that contain from one to about 10 ethoxylate units per molecule with a Navg. of ethoxylate units of about four.

It is to be understood that flushing solutions of the invention are not limited to the three types of commercially available alkoxylated aromatic alcohol solvents noted above. These types of solvent compositions are provided only as examples of alkoxylated aromatic alcohol solvents that can be used in the flushing solutions of the invention. Applicants emphasize that if an alkoxylated aromatic alcohol solvent is used in the flushing solutions of the invention, the alkoxylated aromatic alcohol solvent is of the general class of compounds defined with an alkoxylate group of formula I attached to an aromatic organic moiety. In particular, the aromatic alkoxylated solvents that can be used in the flushing solutions of the invention are most preferably of the class of compounds defined by formula II or formula III.

Alkoxylated aromatic alcohols that can be used in the present invention include triethylene glycol monophenyl ether, tetraethylene glycol monophenyl ether, pentaethylene glycol monophenyl ether, hexaethylene glycol monophenyl ether, heptaethylene glycol monophenyl ether, triethylene glycol monobenzyl ether, tetraethylene glycol monobenzyl ether, pentaethylene glycol monobenzyl ether, hexaethylene glycol monobenzyl ether, heptaethylene glycol monobenzyl ether, water-soluble ethoxylates of propylene glycol monophenyl ether (preferably, containing an average of at least 2 oxyethylene moieties per molecule), and the like and mixtures thereof.

In one embodiment, the flushing solution contains a solvent component containing at least one compound of general formula I and a fatty acid salt. The flushing solution also contains an alkaline source, in an amount effective to render the flushing solution basic.

In another embodiment, the flushing solution contains a solvent component containing at least one compound of general formula II and a fatty acid salt. The flushing solution also contains an alkaline source, in an amount effective to render the flushing solution basic.

In another embodiment, the flushing solution contains a solvent component containing at least one compound of general formula III, and a fatty acid salt. The flushing solution also contains an alkaline source, in an amount effective to render the flushing solution basic.

The fatty acid salts may be produced by mixing a long chain fatty acid with an amine or alkanolamine. The fatty acid used should have at least least ten carbon atoms, preferably from 10 to 38 carbon atoms, more preferably from 14 to 36 carbon atoms, most preferably from 16 to 34 carbon atoms. In an especially desirable embodiment of the invention, fatty acids containing from 17 to 31 carbon atoms are employed. The fatty acids can be saturated, monounsaturated or polyunsaturated. Branched as well as straight chain fatty acids can be utilized. Mixtures of fatty acids, such as those typically obtained by splitting from natural sources such as vegetable oils, are also useful in the present invention.

The preferred fatty acids are selected from palmitic acid, oleic acid, stearic acid (an especially preferred fatty acid), erucic acid, behenic acid, isostearic acid, and montanic acid. Although fatty acids containing more than 18 carbon atoms are generally quite effective in reducing corrosion, it is sometimes difficult to maintain such fatty acids and their salts in solution at higher concentrations.

The flushing solutions of the present invention preferably contain at least about 0.005 weight percent fatty acid salt, more preferably at least about 0.01 weight percent fatty acid salt. In an especially preferred embodiment, the flushing solution when being used to remove coatings from substrate surfaces contains from about 0.01 to about 0.03 weight percent of a salt of stearic acid.

Amines, alkanolamines, and mixtures of amines and/or alkanolamines may be used to form the fatty acid salts. The preferred alkanolamines are selected from ethanolamine, diethanolamine, triethanolamine, dimethylethanolamine, diisopropanolamine, isopropanolamine, methylisopropanolamine, n-butyldiethanolamine, 2-methylaminoethanol, n-butylaminoethanol, diethylaminoethanol, 2-amino-2-methyl-1-propanol, or phenyl diethanolamine. The most preferred alkanolamines are diisopropanolamine (DIPA) and isopropanolamine. Amines such as alkylamines (e.g., triethylamine) and oxazolidines can also be used. Preferably, the amine or alkanolamine is added in stoichiometric excess relative to the fatty acid so as to also act as the alkaline source.

The flushing solution also contains an alkaline source. The alkaline source can include an inorganic base. Examples of suitable inorganic bases include alkali metal and ammonia hydroxides, alkali metal carbonates, alkali metal silicates, alkali metal phosphates, and other basic alkali metal salts. The alkaline source (or a portion of the alkaline source) can also be the excess amine or alkanolamine used to form the fatty acid salt used in the invention.

In one desirable embodiment of the invention, the fatty acid salts present in the flushing solution are substantially (i.e., at least 80 mole %) or entirely alkylammonium and/or alkanolammonium salts and the alkaline source is substantially (i.e., at least 80 mole %) or entirely an alkylamine, alkanolamine or mixture thereof.

In another embodiment, a buffering agent is added to the flushing solutions of the invention. The buffering agent can be any chemical buffering agent or system that provides and helps maintain a pH of the flushing solution that is lower than the pH of an essentially identical flushing solution that does not contain the buffering agent. It is preferred that the pH of the flushing solution be from about 8 to about 12.5, more preferably from about 9.0 to about 11.5.

The buffering agent can be a buffering organic acid or a salt thereof, or a buffering inorganic acid or salt thereof. If the buffering agent utilized is an inorganic acid, the use of a diprotic or triprotic acid is preferred. Inorganic acids that can be used include phosphoric acid, boric acid, and salts of these acids. The buffering organic acids that can be used include, but are not limited to, gluconic acid, malic acid, glycolic acid, benzoic acid, citric acid, and salts and mixtures thereof.

The flushing solutions of the invention can also comprise a solvent component, an alkaline source, and an aliphatic phosphate ester in combination with a buffering agent. The buffering agent is preferably a diprotic or triprotic inorganic acid, e.g., phosphoric acid and/or boric acid. If the aliphatic phosphate ester is used without the buffering agent, the flushing solution exhibits little, if any, corrosion inhibition of the aluminum or aluminum-alloy spray equipment. Likewise, if the buffering agent is used without the aliphatic phosphate ester or the fatty acid salt, again little, if any, corrosion inhibition is observed. Corrosion inhibition is provided, however, in a flushing solution of the invention that contains both the phosphate ester and the buffering agent. Although not required for purposes of providing effective corrosion inhibition, buffering agents may also be used in combination with fatty acid salts. Likewise, combinations of one or more fatty acid salts, one or more aliphatic phosphate esters and one or more buffering agents may be employed in the corrosion inhibitor component of the flushing solutions.

The preferred aliphatic phosphate esters used in the flushing solutions are ethoxylate phosphate esters of general formula IV, $[RO(CH_2CH_2O)_n]_2P(O)OX$, wherein R is a straight or branched aliphatic hydrocarbon with 1 to 12 carbon atoms, n is from 1 to 6, and X is H, an alkali metal cation or an ammonium cation (e.g., alkylammonium or alkanolammonium). For, example, concentrates containing LK-500®, obtained from Rhodia, exhibit relatively high corrosion inhibition properties. LK-500 is an ethoxylate phosphate ester with the formula $[CH_3(CH_2)_5O(CH_2CH_2O)_3]_2P(O)OH$.

The solvent components that can be used in the flushing solutions can include one or more alkoxylated aromatic alcohols. Alternatively, one or more of the alkoxylated aromatic alcohols of general formula I, II or III, or a mixture of one or more glycols, glycol ethers (especially $C_1$–$C_6$ alkyl mono-ethers of ethylene glycol, propylene glycol and oligomers of these glycols such as, for example, ethylene glycol mono-butyl ether, diethylene glycol n-butyl ether, triethylene glycol methyl ether, propylene glycol n-butyl ether, dipropylene glycol methyl ether, propylene glycol methyl ether, and propylene glycol n-propyl ether), alcohols other than alkoxylated aromatic alcohols (e.g., aliphatic mono-alcohols containing 1 to 6 carbon atoms which can be branched or unbranched such as, for example, n-butanol), ketones, esters, glycol oligomers and the like can be used. Such solvents may advantageously be used in combination with one or more alkoxylated aromatic alcohols. A list of the alkoxylated aromatic alcohols that can be used include triethylene glycol monophenyl ether, tetraethylene glycol monophenyl ether, pentaethylene glycol monophenyl ether, hexaethylene glycol monophenyl ether, heptaethylene glycol monophenyl ether, triethylene glycol monobenzyl ether, tetraethylene glycol monobenzyl ether, pentaethylene glycol monobenzyl ether, hexaethylene glycol monobenzyl ether, heptaethylene glycol monobenzyl ether, water-soluble ethoxylates of propylene glycol monophenyl ether (preferably, containing an average of at least 2 oxyethylene moieties per molecule), and the like and mixtures thereof.

High or low foaming surfactants can be added to the flushing solutions. Also, surfactants with relatively low or high critical micelle temperatures can be used. The surfactant is at times needed to improve initial wetting of the paint or coating to be removed. Also, if deionized water is not used to dilute the flushing solutions, and instead, relatively hard water is used, a surfactant can minimize the build-up of solids that adhere to the surfaces of the application equipment.

The surfactant may be anionic, non-ionic, cationic or amphoteric in character, but preferably is a low foaming surfactant or is used in combination with a defoamer to minimize the amount of foam generated during use. Examples of suitable surfactants include alkylaryl sulfonates such as sodium xylene sulfonate, ethoxylated fatty esters and oils such as MERPOL A (available commercially from E.I. duPont de Nemours & Co.), non-ionic fluorocarbon-based surfactants such as ZONYL FSN (available from E.I. duPont de Nemours & Co.), and non-ionic ethoxylated alkylphenols having at least one long chain alkyl group substituted on the aromatic ring such as ethoxylated octylphenol.

If the water used is very "hard", meaning that it contains substantial concentrations of calcium and/or magnesium cations, a chelating agent for these ions may be needed to minimize unwanted formation of scums on the surfaces being cleaned. Suitable chelating agents include water-soluble compounds containing two or more functional groups such as carboxylic acid groups, phosphoryl groups, amine groups, and/or hydroxyl groups which are arranged in suitable positions in the chelating agent molecule such that atoms in two or more functional groups are capable of complexing with a single calcium and/or magnesium cation. Non-limiting examples of suitable chelating agents include EDTA, gluconic acid, citric acid, polyphosphonic acids, and salts thereof. Such chelating agents may also act as buffering agents.

In addition to the fatty acid salts and aliphatic phosphate esters described herein, corrosion inhibitors known in the art can be present in the flushing solutions of the present invention. Suitable corrosion inhibitors include, but are not limited to, benzotriazoles such as 2-mercaptobenzothiazole, toluoltriazole, benzotriazole, 2(3H)-benzothiazolethione, and borates.

The flushing solutions of the invention can be used to remove paint residue from application spray equipment. Removal of the paint residue is required, for example, when the user switches from one color to another, or following use of the equipment. To prepare a working flushing solution, the end-user dilutes a flushing solution concentrate to about 2% to about 50% by volume with water, preferably deionized water. In other embodiments, the flushing solution concentrate is diluted to about 2% to about 20% by volume, preferably to about 2% to about 10% by volume, by the addition of water. Working flushing solutions can be prepared with about 2% to about 10% by weight of the solvent component; about 0.02 to about 2.0% by weight, preferably about 0.05% to about 0.5% by weight, of alkaline source (including the amount of alkaline source that reacts with free fatty acid to form the fatty acid salt); and about 0.01% to about 1% by weight, preferably about 0.02% to about 0.1% by weight, of fatty acid and/or aliphatic phosphate ester.

Paint can be removed from a paint covered surface by contacting the surface with a flushing solution of the invention. Although the methods of contacting the surface with the flushing solution can be accomplished in a number of ways, immersion and spraying are the most preferred methods. If the surface to be cleaned is readily accessible, then spraying is generally preferred. The mechanical force of the impinging flushing solution facilitates removal of the paint. On the other hand, if the surface to be cleaned has recesses or other shapes that are not readily accessible, immersion will generally be preferred. Of course, both methods can be used in combination and/or varied in ways apparent to those skilled in the art. The optimal dilution ratio and temperature of the flushing solution depend on the method of contact and the type of coating to be removed, among other factors. It is to be understood however, that those skilled in the art can determine optimal conditions for particular coating removal applications by minimal experimentation.

The flushing solutions of the present invention are also useful for removing paint residues from automated and manual equipment such as paint sprayers and paint dip installations. Typically, the flushing solution concentrate is introduced into a purge tank containing an amount of deionized water effective to dilute the flushing solution concentrate to about 5% to about 15% by volume. The resulting diluted flushing solution is heated to a temperature of from about 30° C. to about 60° C. and then circulated through the equipment to remove any residual paint from the equipment. However, in practice, the temperature of the circulating flushing solution is often lower than the temperature of the flushing solution in the purge tank due to the consequent heat loss during circulation. Prior to and/or after circulation of the diluted flushing solution, the equipment may be subjected to other cleaning methods such as flushing with water or with a gas such as air or nitrogen. To minimize waste, used diluted flushing solution can be reconditioned (by removing paint solids by means such as filtration, settlement, coagulation or the like) and recirculated through the equipment.

The contact time needed to effect a substantial removal of paint from a surface will depend on the nature and thickness of the paint, the composition of the flushing solution including the dilution factor, the temperature of the solution, and other factors. With some paints and under some conditions, contact times of a few minutes (e.g., 2–3 minutes) may be sufficient. In some instances, the contact times can be 1 hour or more.

If the flushing solutions are sprayed onto a surface, the spraying pressure will usually range from 1.3 bars to 8.0 bars absolute pressure. The temperature of the flushing solution will usually range from 15° C. to 60° C. Higher temperatures and pressures generally increase the rate at which the paint is removed from the surface.

The invention and its benefits will be better understood with reference to the following examples. These examples are intended to illustrate specific embodiments within the overall scope of the invention as claimed, and are not to be understood as limiting the invention in any way.

EXAMPLES

Flushing solutions of the invention were prepared in concentrated form and then diluted with deionized water. For example, the flushing solution concentrates described in Tables 1–5 were prepared containing from 38% to 42% by weight water. These concentrates were then diluted with deionized water to 4% to 6% by volume. As a result, the diluted flushing solutions contained approximately 95% to 98% by volume water. Tables 6 and 7 describe flushing solution concentrates prepared using n-butanol as a co-solvent together with alkoxylated aromatic alcohol, but little or no water. These concentrates were then diluted with deionized water to 10% by volume. As a result, the diluted flushing solutions contained approximately 90% by volume water.

The corrosion inhibition properties of the diluted flushing solutions were measured as follows. A bare aluminum coupon was rinsed using water then wiped dry with a paper towel. The coupon was submerged into ajar containing the flushing solution and capped. The solutions were heated to 120 F. for 7 days (Tables 1–5) or 100 F. for 7 days (Tables 6–7). After aging, the coupons were rinsed with tap water, and dried with a paper towel. The treated coupons were compared to an untreated, bare aluminum coupon. A failure to inhibit corrosion resulted in the coupon darkening in color, having pitting corrosion or producing white crystalline corrosion products on the surface of the coupon. A passing grade resulted in a coupon which showed little or no staining of the surface and little or no pitting or surface crystals on the coupon.

GENAPOL BA 04 ethoxylated benzyl alcohol was obtained from Clariant AG. The manufacturer characterized this product as having a Navg. of about 4.

MIPA is isopropanolamine.

DIPA is disopropanolamine.

LK-500 obtained from Rhodia, is a polyoxyethylene hexyl ether phosphate ester with the formula $[CH_3(CH_2)_5O(CH_2CH_2O)_3]_2P(O)OH$.

LK-700 obtained from Rhodia, is a polyoxyethylene phenylether phosphate ester.

CORFREE MI, obtained from DuPont, is a diacid of formula $HO_2C(CH_2)_nCO_2H$, where n is 8–10.

TS-211, obtained from Witco, is a ethoxylated phenol phosphate ester.

COBRA TECH 928, obtained from PMC Specialities Group, Inc., is a corrosion inhibitor formulation that includes triazole.

COBRA TECH 99, obtained from PMC Specialities Group, Inc., is a corrosion inhibitor formulation that includes benzatriazole.

POLYRAD 1110, obtained from Hercules, Inc., is hydroabietylamine ethoxylated with about 10 moles of ethylene oxide per mole of hydroabietylamine.

Examples 1C–14C in the following tables are comparative examples.

TABLE 1

| Examples | 1 | 2 | 3 | 4 | 5 | 6 | 7 | 1C |
| --- | --- | --- | --- | --- | --- | --- | --- | --- |
| % wt. GENAPOL BA 04 | 54 | 54 | 54 | 54 | 54 | 53.5 | 53.5 | 52.9 |
| % wt. DIPA | 6 | 6 | 6 | 6 | 6 | 5.9 | 5.9 | 5.9 |
| % wt. De-ionized water | 38 | 38 | 38.5 | 38.8 | 38.5 | 38.6 | 38.6 | 38.2 |
| % wt. Oleic Acid | 1 | | 0.5 | 0.21 | 0.5 | | | |
| % wt. Boric Acid | | | | | | | | |
| % wt. Phosphoric Acid | 1 | 1 | 1 | 1 | 1 | 1 | 1 | 1 |
| % wt. LK-500 | | 0.5 | | | | 1 | | |
| % wt. LK-700 | | | | | | | 1 | |
| % wt. Cobra Tech 928 | | | | | | | | 1 |
| % wt. Gluconic Acid | | 0.5 | | | | | | 1 |
| Dilution of Concentrate by Volume | 6% | 6% | 6% | 6% | 6% | 6% | 6% | 6% |
| Corrosion Test Results: | Pass | Pass | Pass | Pass | Pass | Pass | Fail | Fail |

TABLE 2

| Examples | 9 | 10 | 11 | 12 | 13 | 14 | 15 | 16 |
|---|---|---|---|---|---|---|---|---|
| % wt. GENAPOL BA 04 | 54 | 54 | 54 | 54 | 54 | 54 | 54 | 54 |
| % wt. DIPA | 6 | 6 | 6 | 6 | 6 | 6 | 6 | 6 |
| % wt. De-ionized water | 38.5 | 38.5 | 38.5 | 38.5 | 38 | 38 | 38 | 38 |
| % wt. Oleic Acid | 0.5 | 0.5 | 0.5 | 0.5 | 0.5 | 0.1 | 1 | 1 |
| % wt. Boric Acid | | | | | | | | 1 |
| % wt. Phosphoric Acid | 1 | 1 | 1 | 1 | 1 | 1 | | |
| % wt. Gluconic Acid | | | | | 0.5 | | 1 | |
| Dilution of Concentrate by Volume | 6% | 5% | 4% | 3% | 6% | 6% | 6% | 6% |
| Corrosion Test Results: | Pass | Pass | Pass | Pass | Pass | Fail | Pass | Pass Excellent |

TABLE 3

| Examples | 2C | 3C | 19 | 20 | 21 | 22 | 23 | 24 |
|---|---|---|---|---|---|---|---|---|
| % wt. Genapol BA 04 | 54 | 54 | 54 | | 54 | 54 | 54 | 54 |
| % wt. DIPA | 6 | 6 | | | | 6 | 6 | 6 |
| % wt. De-ionized water | 38 | 38 | 38 | | 41.5 | 38.5 | 38.8 | 38.9 |
| % wt. MIPA | | | | 6 | 2 | 3 | | |
| % wt. n-Butoxyethanol | | | | 96.9 | | | | |
| % wt. Oleic Acid | | | 1 | 0.5 | 0.5 | .5 | 0.2 | 0.1 |
| % wt. Boric Acid | | | | | 1 | 1 | 1 | 1 |
| % wt. Phosphoric Acid | 1 | 1 | 1 | 0.6 | | | | |
| % wt. Pelargonic Acid | 1 | | | | | | | |
| % wt. CORFREE MI | | 1 | | | | | | |
| % wt. Gluconic Acid | | | | | | | | |
| Dilution of Concentrate by Volume | 6% | 6% | 5% | 5% | 5% | 5% | 5% | 5% |
| Corrosion Test Results: | Fail | Fail | Fail | Pass | Pass | Pass | Pass | Pass |

TABLE 4

| Examples | 25 | 4C | 27 | 28 | 29 | 30 | 31 | 32 |
|---|---|---|---|---|---|---|---|---|
| % wt. GENAPOL BA 04 | 54 | 54 | 54 | 54 | 54 | 54 | 54 | 54 |
| % wt. DIPA | 6 | 6 | 6 | 6 | 6 | 6 | 6 | 6 |
| % wt. De-ionized water | 39 | 38 | 38 | 38 | 39.5 | 39 | 39.3 | 39.5 |
| % wt. Oleic Acid | 0.5 | | 2 | | 0.5 | 1 | 0.2 | 0.2 |
| % wt. Boric Acid | 0.5 | 2 | | 1 | | | 0.5 | 0.3 |
| % wt. Stearic Acid | | | | 1 | | | | |
| Dilution of Concentrate by Volume | 5% | 5% | 5% | 5% | 5% | 5% | 5% | 5% |
| Corrosion Test Results: | Pass | Fail | Pass | Pass | Pass | Fail | Fail | Fail |

TABLE 5

| Examples | 5C | 6C | 7C | 8C | 9C |
|---|---|---|---|---|---|
| % wt. GENAPOL BA 04 | 54 | 54 | 54 | 54 | 54 |
| % wt. DIPA | 6 | 6 | 6 | 6 | 6 |
| % wt. De-ionized water | 39 | 38 | 38 | 38 | 39.5 |
| % wt. LK-500 | 1 | 2 | | | 0.5 |
| % wt. LK-700 | | | 2 | | |
| % wt. TS-211 | | | | 2 | |
| Dilution of Concentrate by Volume | 5% | 5% | 5% | 5% | 5% |
| Corrosion Test Results: | Fail | Fail | Fail | Fail | Fail |

TABLE 6

| Example | 33 | 34 | 35 | 36 | 37 | 38 | 39 | 40 | 10C | 41 | 42 | 43 | 44 | 11C | 12C | 45 | 46 | 47 |
|---|---|---|---|---|---|---|---|---|---|---|---|---|---|---|---|---|---|---|
| % wt GENAPOL BA 04 | 27 | 27 | 27 | 27 | 27 | 27 | 27 | 27 | 27 | 27 | 27 | 27 | 27 | 27 | 27 | 27 | 27 | 27 |
| % wt. MIPA | | | 2 | | | | | | | | | | | | | | | |
| % wt. DIPA | | | | 1 | 1 | 1 | 1 | 1 | 1 | 1 | 1 | 1 | 1 | 1 | 1 | 1 | | |
| % wt. 85% DIPA | 1.18 | 1.18 | | | | | | | | | | | | | | | 1.18 | 1.18 |
| % wt. De-ionized Water | | | | | | | | 0.5 | | | 0.12 | 0.12 | 0.12 | 0.12 | 0.12 | 0.12 | | |
| % wt. Oleic Acid | | | | 0.1 | 0.15 | | | | | | 0.15 | 0.15 | | | | 0.15 | 0.2 | |
| % wt. Boric Acid | | | | | | | | | | | | | | | | | | |
| % wt Stearic Acid | | | | | | 0.15 | | | | 0.15 | 0.15 | | | | | | | 0.2 |
| % wt n-butanol | 71.47 | 71.47 | 70 | 71.8 | 71.7 | 71.55 | 71.7 | 71 | 71.8 | 71.43 | 71.73 | 71.73 | 71.23 | 71.08 | 71.48 | 71.38 | 71.42 | 71.47 |
| % wt Isononanoic Acid | | | | | | | | | | 0.3 | | | | 0.4 | 0.4 | 0.2 | 0.2 | |
| % wt Boric Acid TEA salt | | | | | | | | | | | | | | 0.5 | 0.4 | | | |
| % wt. POLYRAD 1110 | | | | | | | | | 0.2 | | | | | | | | | |
| % wt. Palmitic Acid Acid | | | | | | | | 0.5 | | | | | | | | | | |
| % wt. Palmitic Acid | | | | | | | 0.3 | | | | | | | | | | | |
| % wt. Benzoic Acid | 0.15 | | | 0.1 | 0.15 | 0.3 | | | | | | | | | | | | 0.15 |
| % wt. Montanic Acid | 0.2 | 0.35 | 0.3 | | | | | | | | | | | | | | | |
| Dilution of Concentrate by Volume | 10% | 10% | 10% | 10% | 10% | 10% | 10% | 10% | 10% | 10% | 10% | 10% | 10% | 10% | 10% | 10% | 10% | 10% |
| Corrosion Test Results for 5182 Aluminum Coupon (7 days at 100 F.) | Pass | Pass | Pass | Fail | Fail | Pass | Fail | Fail | Fail | Pass | Fail | Fail | Fail | Fail | Fail | Pass | Pass | Pass |
| pH at 10% dilution of concentrate by volume | 9.3 | | 10.79 | 9.48 | 9.4 | 9.07 | 9.55 | 9.29 | 10.13 | 9.17 | 9.8 | 9.91 | 9.45 | 9.2 | 9.16 | 9.35 | ** | 9.2 |

TABLE 7

| Examples | 48 | 49 | 50 | 51 | 13C | 52 | 53 | 54 | 14C |
|---|---|---|---|---|---|---|---|---|---|
| % wt. Genapol BA 04 | 27 | 27 | 27 | 27 | 27 | 27 | 27 | 27 | 27 |
| % wt. MIPA | 2 | 2 | 2 | 2 | 3 | | | | 3 |
| % wt. DIPA | | | | | | 2 | 2 | 2 | |
| % wt. Oleic Acid | 0.5 | 0.5 | 0.75 | 0.5 | | 0.5 | 0.7 | 0.3 | |
| % wt. Boric Acid | 0.5 | | 0.5 | 0.5 | | 0.3 | | 0.3 | |
| % wt. Stearic Acid | | | | | | | | | |
| % wt. n-butanol | 70 | 70.5 | 69.75 | 69.8 | 70 | 70.2 | 70.3 | 70.4 | 68.5 |
| % wt. COBRATECH 99 | | | | 0.2 | | | | | |
| % wt. COBRATECH 948 | | | | | | | | | 0.5 |
| % wt. CORFREE MI | | | | | | | | | 1 |
| Dilution of Concentrate by Volume | 10% | 10% | 10% | 10% | 10% | 10% | 10% | 10% | 10% |
| Corrosion Test Results for 5182 Aluminum Coupon (24 hours at 100 F.) | Pass | Pass | Pass | ** | Fail | Pass | Pass | Pass | ** |
| Corrosion Test Results for T-6 Cast Aluminum Coupon (24 Hours at 100 F.) | Fail | Fail | Pass | Fail | Fail | Pass | Pass | Pass | Fail |

What is claimed is:

1. A flushing solution composition comprising:

an organic solvent component which comprises one or more compounds each of which contains at least one aromatic ring, said compounds comprising 1.62 to 3.24 weight percent of the flushing solution composition;

0.005 to 0.10 weight percent of a fatty acid salt; and an alkaline source.

2. The flushing solution composition of claim 1 wherein the alkaline source is selected from the group consisting of inorganic bases, alkanolamines, amines, and mixtures thereof.

3. The flushing solution composition of claim 1 further comprising a buffering agent selected from the group consisting of buffering organic acids, salts of buffering organic acids, buffering inorganic acids, salts of buffering inorganic acids and mixtures thereof.

4. The flushing solution composition of claim 1 further comprising a buffering agent selected from the group consisting of phosphoric acid, boric acid, benzoic acid, gluconic acid, citric acid and salts and mixtures thereof.

5. The flushing solution composition of claim 1 wherein the organic solvent component comprises one or more compounds each of which contains at least one aromatic ring and alkoxylate units of general formula I

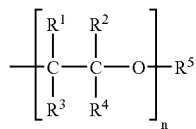

wherein: $R^1$, $R^2$, $R^3$ and $R^4$ are independently selected from hydrogen and methyl; $R^5$ is hydrogen, a $C_1$–$C_6$ alkyl, or phenyl; and n is 2–10.

6. The flushing solution composition of claim 1 wherein the organic solvent component comprises a mixture of alkoxytated aromatic alcohols of general formula II with a number average Navg. of alkoxylate units from about 2.5 to about 5, and wherein $R^1$, $R^2$, $R^3$, $R^4$ and $R^5$ are as defined for formula I, and $R^6$, $R^7$ and $R^8$ are independently selected from hydrogen and $C_1$–$C_4$ alkyl

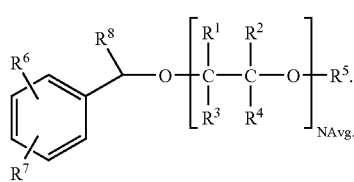

7. The flushing solution composition of claim 1 wherein the organic solvent component comprises a mixture of alkoxylated aromatic alcohols of general formula III with a number average Navg. of alkoxylate units from about 2.5 to about 5, wherein $R^1$, $R^2$, $R^3$, $R^4$ and $R^5$ are as defined for formula I, and $R^6$ and $R^7$ are independently selected from hydrogen and $C_1$–$C_4$ alkyl

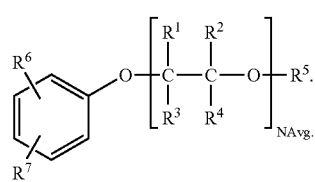

8. The flushing solution composition of claim 1 wherein the fatty acid salt is obtained by combining a fatty acid with sixteen or more carbons with a nitrogen-containing compound selected from the group consisting of amines, alkanolamines, and mixtures thereof.

9. The flushing solution composition of claim 8 wherein the fatty acid is selected from the group consisting of palmitic acid, oleic acid, stearic acid, montanic acid and mixtures thereof.

10. The flushing solution composition of claim 1 wherein the organic solvent component contains one or more water-soluble or water-miscible compounds selected from the group consisting of glycols, glycol ethers, alcohols, alkoxylated alcohols, esters, ketones and mixtures thereof.

11. The flushing solution composition of claim 1 wherein the organic solvent component contains one or more alkoxylated aromatic alcohols selected from the group consisting of ethoxylated phenols, ethoxylated benzyl alcohols and mixtures thereof.

12. The flushing solution composition of claim 1 wherein at least one alkanolamine is present in cationic or free base form.

13. The flushing solution composition of claim 1 wherein the fatty acid salt has an alkanolammonium cation.

14. The flushing solution composition of claim 1 wherein the organic solvent component is comprised of an alkoxylated aromatic alcohol and a C1–C6 aliphatic mono-alcohol.

15. The flushing solution composition of claim 1 wherein:
the organic solvent component is comprised of an alkoxylated aromatic alcohol and an aliphatic mono-alcohol;
the fatty acid salt comprises ten or more carbons; and
the alkaline source comprises an amine and/or alkanolamine.

16. The flushing solution composition of claim 15 wherein the fatty acid is selected from the group consisting of palmitic acid, oleic acid, stearic acid, montanic acid and mixtures thereof.

17. The flushing solution composition of claim 15 further comprising a buffering agent.

18. A flushing solution composition comprising:
(a) an organic solvent component comprising a mixture of alkoxylated benzyl alcohols;
(b) a fatty acid salt obtained by combining a fatty acid with a nitrogen-containing compound selected from the group consisting of amines, alkanolamines, and mixtures thereof; and
(c) an alkaline source.

19. The flushing solution composition of claim 18 wherein the alkaline source is selected from the group consisting of inorganic bases, alkanolamines, amines, and mixtures thereof.

20. The flushing solution composition of claim 18 further comprising a buffering agent selected from the group consisting of buffering organic acids, salts of buffering organic acids, buffering inorganic acids, salts of buffering inorganic acids and mixtures thereof.

21. The flushing solution composition of claim 18 further comprising a buffering agent selected from the group consisting of phosphoric acid, boric acid, benzoic acid, gluconic acid, citric acid and salts and mixtures thereof.

22. The flushing solution composition of claim 18 wherein the organic solvent component further comprises one or more compounds each of which contains at least one aromatic ring and alkoxylate units of general formula I

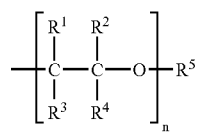

wherein: $R^1$, $R^2$, $R^3$ and $R^4$ are independently selected from hydrogen and methyl; $R^5$ is hydrogen, a $C_1$–$C_6$ alkyl, or phenyl; and n is 2–10.

23. The flushing solution composition of claim 18 wherein the organic solvent component comprises a mixture of alkoxylated aromatic alcohols of general formula II with a number average Navg. of alkoxylate units from about 2.5 to about 5, and wherein $R^1$, $R^2$, $R^3$, $R^4$ and $R^5$ are as defined for formula I, and $R^6$, $R^7$ and $R^8$ are independently selected from hydrogen and $C_1$–$C_4$ alkyl

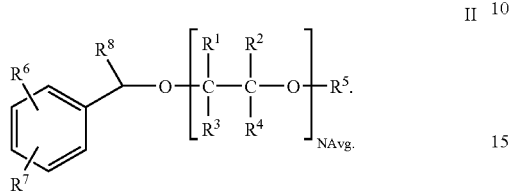

24. The flushing solution composition of claim 18 wherein the organic solvent component further comprises a mixture of alkoxylated aromatic alcohols of general formula III with a number average Navg. of alkoxylate units from about 2.5 to about 5, wherein $R^1$, $R^2$, $R^3$, $R^4$ and $R^5$ are as defined for formula I, and $R^6$ and $R^7$ are independently selected from hydrogen and $C_1$–$C_4$ alkyl

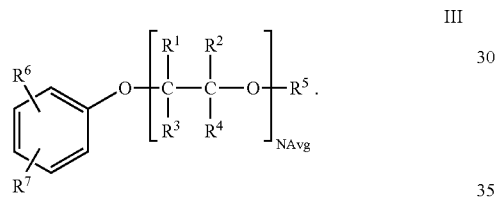

25. The flushing solution composition of claim 18 wherein the fatty acid salt is obtained by combining a fatty acid with sixteen or more carbons with a nitrogen-containing compound selected from the group consisting of amines, alkanolamines, and mixtures thereof.

26. The flushing solution composition of claim 25 wherein the fatty acid is selected from the group consisting of palmitic acid, oleic acid, stearic acid, montanic acid and mixtures thereof.

27. The flushing solution composition of claim 1 further comprising water, and the organic solvent component is present from 60% to 99% by weight, not including the weight percent of water in the composition.

28. The flushing solution composition of claim 18 wherein the organic solvent component contains one or more water-soluble or water-miscible compounds selected from the group consisting of glycols, glycol ethers, alcohols, alkoxylated alcohols, esters, ketones and mixtures thereof.

29. The flushing solution composition of claim 18 wherein the organic solvent component contains one or more alkoxylated aromatic alcohols selected from the group consisting of ethoxylated phenols, ethoxylated benzyl alcohols and mixtures thereof.

30. The flushing solution composition of claim 18 wherein at least one alkanolamine is present in cationic or free base form.

31. The flushing solution composition of claim 18 wherein the fatty acid salt has an alkanolammonium cation.

32. The flushing solution composition of claim 18 wherein the organic solvent component is comprised of an alkoxylated benzyl alcohol and a C1–C6 aliphatic mono-alcohol.

33. A flushing solution composition formed by combining:
an organic solvent component which comprises a mixture of alkoxylated aromatic alcohols of general formula I with a number average Navg. of alkoxylate units from about 2.5 to 5, wherein $R^1$, $R^2$, $R^3$ and $R^4$ are independently selected from hydrogen and methyl; $R^5$ is hydrogen, a $C_1$–$C_6$ alkyl, or phenyl, and $R^6$ and $R^7$ are independently selected from hydrogen and $C_1$–$C_4$ alkyl

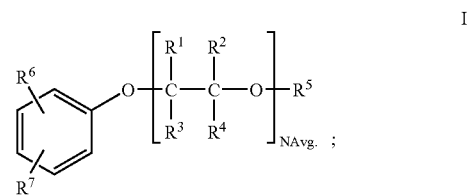

a fatty acid having ten or more carbons; and
an alkaline source comprising an amine and/or alkanolamine, said alkaline source being present in stoichiometric excess relative to said fatty acid, wherein the flushing solution composition has a pH of at least 8.

34. The flushing solution composition of claim 33 wherein the alkaline source further comprises an inorganic base.

35. The flushing solution composition of claim 33 further comprising a buffering agent selected from the group consisting of buffering organic acids, salts of buffering organic acids, buffering inorganic acids, salts of buffering inorganic acids and mixtures thereof.

36. The flushing solution composition of claim 33 further comprising a buffering agent selected from the group consisting of phosphoric acid, boric acid, benzoic acid, gluconic acid, citric acid and salts and mixtures thereof.

37. The flushing solution composition of claim 33 wherein the organic solvent component further comprises a mixture of alkoxylated aromatic alcohols of general formula II with a number average Navg. of alkoxylate units from about 2.5 to about 5, and wherein $R^1$, $R^2$, $R^3$, $R^4$ and $R^5$ are as defined for formula I, and $R^6$, $R^7$ and $R^8$ are independently selected from hydrogen and $C_1$–$C_4$ alkyl

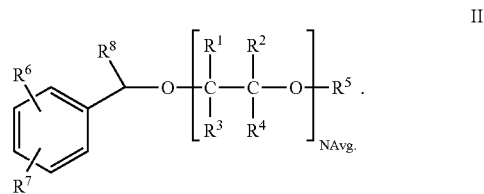

38. The flushing solution composition of claim 33 wherein the organic solvent component comprises a mixture of alkoxylated aromatic alcohols of general formula III with a number average Navg. of alkoxylate units of about 4, wherein $R^1$, $R^2$, $R^3$, $R^4$ and $R^5$ are as defined for formula I, and $R^6$ and $R^7$ are independently selected from hydrogen and $C_1$–$C_4$ alkyl

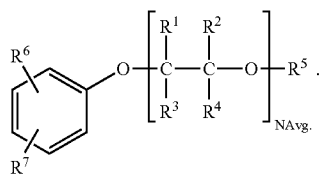

39. The flushing solution composition of claim 33 wherein the fatty acid has sixteen or more carbons.

40. The flushing solution composition of claim 33 wherein the fatty acid is selected from the group consisting of palmitic acid, oleic acid, stearic acid, montanic acid and mixtures thereof.

41. The flushing solution composition of claim 33 further comprising water, and the organic solvent component is present from 60% to 99% by weight, not including the weight percent of water in the composition.

42. The flushing solution composition of claim 33 wherein the organic solvent component contains one or more water-soluble or water-miscible compounds selected from the group consisting of glycols, glycol ethers, alcohols, alkoxylated alcohols, esters, ketones and mixtures thereof.

43. The flushing solution composition of claim 33 wherein the organic solvent component contains one or more alkoxylated aromatic alcohols selected from the group consisting of ethoxylated phenols, ethoxylated benzyl alcohols and mixtures thereof.

44. The flushing solution composition of claim 33 wherein at least one alkanolamine is present in cationic or free base form.

* * * * *

UNITED STATES PATENT AND TRADEMARK OFFICE
CERTIFICATE OF CORRECTION

PATENT NO. : 7,091,163 B2  
APPLICATION NO. : 10/481256  
DATED : August 15, 2006  
INVENTOR(S) : Wilson Page 1 of 1

It is certified that error appears in the above-identified patent and that said Letters Patent is hereby corrected as shown below:

Column 17, line 23, delete "alkoxytated" and insert therefor --alkoxylated--.

Signed and Sealed this

Fourteenth Day of November, 2006

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,091,163 B2 | Page 1 of 1 |
| APPLICATION NO. | : 10/183662 | |
| DATED | : August 15, 2006 | |
| INVENTOR(S) | : Wilson | |

It is certified that error appears in the above-identified patent and that said Letters Patent is hereby corrected as shown below:

Column 17, line 23, delete "alkoxytated" and insert therefor --alkoxylated--.

This certificate supersedes Certificate of Correction issued November 14, 2006.

Signed and Sealed this

Second Day of January, 2007

JON W. DUDAS
*Director of the United States Patent and Trademark Office*